Oct. 16, 1956
W. B. GUGGI
2,767,364
MOTOR CONTROL SYSTEM
Filed May 6, 1955
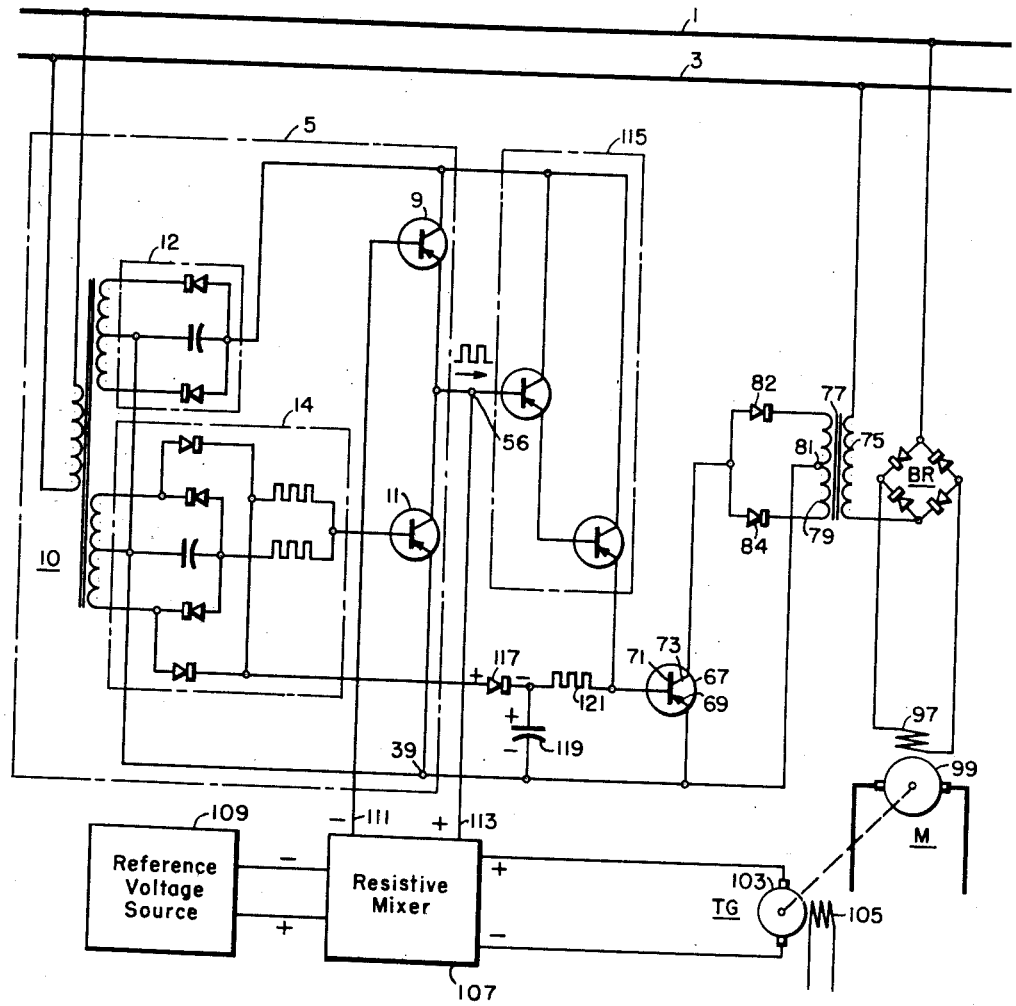
WITNESSES
INVENTOR
Walter B. Guggi
BY
ATTORNEY 2,767,364
Patented Oct. 16, 1956

2,767,364
MOTOR CONTROL SYSTEM

Walter B. Guggi, Snyder, N. Y., assignor to Westinghouse Electric Corporation, East Pittsburgh, Pa., a corporation of Pennsylvania Application May 6, 1955, Serial No. 506,473

5 Claims. (Cl. 318—317)

My invention relates generally to motor control systems and, more particularly, to motor control systems wherein junction transistors are utilized as control elements.

In the prior art there are many systems for controlling and regulating the speed of an electric motor which systems require auxiliary control apparatus of more or less circuit complexity and which vary considerably in the preciseness of the control achieved thereby. As the preciseness and accuracy of the control is increased, almost inevitably the complexity of the required control equipment likewise increases in proportion. To reduce the complexity and cost of the control apparatus and to lessen the frequency and difficulty of maintenance thereof, it is desirable that the apparatus be kept as simple as possible and that the components be as rugged and trouble-free as possible.

One object of my invention is to provide a motor control system having a minimum of circuit complexity which will precisely and accurately control the operation of the motor and its associated driven equipment.

Another object is to provide a precise and accurate motor control system utilizing simple, rugged component parts.

Still another object is to provide a motor control system having improved operating characteristics with a minimum of circuit complexity.

A further object is to provide a motor control system utilizing junction transistors as primary control elements wherein standard apparatus may be utilized to match transistor characteristics without the necessity for special design or modification of the apparatus.

A still further object is to provide a motor control system utilizing junction transistors as primary control elements wherein any motor with any voltage rating may be controlled without regard to the maximum voltage rating of the transistor.

According to one feature of my invention, the field winding of a direct current motor is energized from the output terminals of a bridge rectifier connected across an A. C. source through the primary winding of a transformer. The secondary winding of the transformer is coupled across the emitter and collector terminals of a junction type transistor which is alternately and successively switched from cutoff to full conduction by means of a rectangular voltage pulse source coupled between the base and emitter electrodes of the transistor. When the transistor is at full conduction, the emitter-conductor impedance is very low, often less than two ohms with fused junction transistors. The secondary is virtually short-circuited, which greatly reduces the impedance of the primary to current therethrough because the back magnetomotive force effected by the secondary reduces the flux linkages through the primary winding. When the transistor is at cutoff, the secondary is virtually open-circuited so the primary impedance is very high, the transformer being essentially an iron core choke. Briefly, when the secondary winding is short-circuited, the reactance of the primary winding is almost infinite, but when the secondary is short-circuited, the primary reactance is of an extremely small value. By switching the transistor between the extremes of current conduction, the time delay of the primary circuit becomes extremely short, inasmuch as $$\frac{L}{R}$$

of the circuit is virtually zero for either condition of operation.

Other objects and features of my invention will become apparent upon consideration of the following description thereof when taken in conjunction with the accompanying drawing wherein the single figure is a schematic diagram of an embodiment of my invention.

With reference now to the embodiment of my invention shown in the single figure of the drawing, there is depicted a transformer 77 having a secondary winding 75 connected across A. C. buses 1 and 3 through a bridge rectifier BR through the input terminals of the rectifier. A separately energized field winding 97 of direct current motor M, the speed of which motor is to be controlled, is connected across the output terminals of rectifier BR.

For the purpose of controlling the reactance presented by primary winding 75 to the flow of current through bridge rectifier BR and field winding 97, a junction transistor 67 is connected to the center-tapped secondary winding 79 of transformer 77. The emitter 69 of transistor 67 is connected directly to center tap 81 of secondary winding 79, and emitter 73 thereof is connected to the outer terminals of winding 79 by means of single-phase rectifiers 82 and 84. By this manner of connection, the respective halves of secondary winding 79 to which rectifiers 82 and 84 are connected alternately supply operating potential of the correct polarity to junction transistor 67. As shown, junction transistor 67 is of the p-n-p type although an n-p-n type may be substituted therefor by reversing the polarity of the connection of rectifiers 82 and 84 so that current flows therethrough in the opposite direction to that shown. The junction transistor is a preferred type of switching device for this application inasmuch as the emitter-to-collector impedance thereof is about two ohms when the collector current is driven to saturation, and several hundred thousand ohms at cutoff. The ease with which it can be switched between the extremes of current conduction is another factor in its favor.

Transistor 67 is operated in switching service; i. e., the collector current is either at cutoff or at saturation (full current conduction). For operation in this mode, rectangular-wave control pulses must be applied between the base and emitter of the transistor, the duty cycle of which pulses is to be varied in accordance with the desired average current flow through field winding 97 to maintain the speed of motor M at a desired value. The duty cycle of the control pulses must, therefore, be variable in accordance with the speed of motor M to exert a control effect which will tend to maintain the motor at the desired operating speed.

To this end there is provided a tachometer generator TG having a separately excited field winding 105. The tachometer generator is driven by motor M so that the output voltage thereof is either proportional or functionally related to the motor speed. The voltage appearing across tachometer generator armature 103 is compared with the output voltage of a reference voltage source 109 by means of resistive mixer 107 so that the output voltage from mixer 107 appearing across output lines 111 and 113 is proportional to the difference of the magnitude of the voltages from armature 103 and from reference source 109. Reference voltage source 109 may be any direct current source that is variable at the will of the operator, and the resistive mixer 107 may be of any type well known to the art such as that illustrated in my copending application Serial No. 506,472, filed May 6, 1955, for "Motor Control System."

Control pulses for transistor 67 are derived from pulse source 5; the duty cycle of the output pulses from which is variable in accordance with the magnitude of the voltage appearing across lines 111 and 113. The preferred type of pulse source illustrated in the figure is shown and described in detail in my copending application Serial No. 502,470, filed April 19, 1955, for Pulse Width Modulator. Briefly, this pulse source makes use of two constant current devices such as junction transistors 9 and 11, the emitter-to-collector current conduction paths of which are serially connected across a direct current source 12. The output voltage from a source 14 on generally triangular-wave voltage pulses is applied between the emitter and base of transistor 11, while mixer output lines 113 and 111 are respectively connected to the emitter and base electrodes of transistor 9. As explained in the aforedesignated application Serial No. 502,470, the output pulses appearing between the emitter and collector of either of the transistors is essentially a rectangular wave, the duty cycle of which is variable in accordance with the magnitude of the voltage between the emitter and base of transistor 9. As shown, the output pulses from pulse source 5 are derived across transistor 11 and are applied between base 71 and emitter 69 of transistor 67 by means of a cascaded preamplifier 115. The cascaded preamplifier is of the type described in the copending application of R. A. Jacobs, Jr., Serial No. 487,887, filed February 14, 1955 for "Transistor Amplifier." The advantage of utilizing this type of preamplifier is that it inherently introduces a large amount of feedback which provides maximum stability within the system, is extremely simple and entails the use of very few components. The direct coupling of all of the stages from the pulse generator 5 to transistor 67 permits the transfer of pulses from zero amplitude to the final amplitude of the pulse with any desired intermediate condition which insures a maximum possible control range and numerizes time lag in the transfer of pulses from pulse source 5 to transistor 67.

Transistor 67 is biased to cutoff from a bias source including rectifier 117, filter capacitor 119 and isolating resistor 121. The bias circuit is energized through transformer 10 from A. C. lines 1 and 3.

Let it be assumed that initially motor M is at rest and there is zero voltage from tachometer TG so that the voltage between lines 111 and 113 is substantially equal to the output voltage of source 109, and also so that no output pulses appear at the output of pulse generator 5. Transistor 67 will be biased to cutoff, and primary winding 75 will offer maximum impedance to the flow of current therethrough. Very little current will flow through field winding 97 and the motor M will begin to accelerate. Tachometer generator 103 will thereupon generate a voltage which will be compared with that derived from reference source 109 to produce an output voltage from resistive mixer 107 which will gradually decrease in magnitude in accordance with the voltage difference between the outputs of tachometer generator 103 and reference source 109. As the mixer output voltage appearing across lines 111, 113 progressively decreases in magnitude, and then reversese its polarity; the duty cycle of the output pulses appearing across transistor 11 will increase, and transistor 67 will be biased to full conduction for increasing periods of time. The average current through field winding 97 will likewise increase until a state is reached whereat the system is in balance. At this point, the output voltage across lines 111 and 113 will be such that a further decrease in the magnitude of the voltage will increase the duty cycle of the output pulses from source 5 so as to effect a reduction in the speed of the motor. It has been found that the system will remain very exactly in balance with a minimum amount of hunting due to amplifier delay about the desired operating motor speed.

The operating speed of the motor may be readily controlled by varying the magnitude of the output voltage from reference source 109.

As the motor output shaft is loaded, as by an electrical generator or a mechanical load, the speed of the motor will tend to decrease. This will lessen the magnitude of the output voltage of tachometer generator 103, decrease the voltage across lines 111, 113, decrease the duty cycle of the output pulses from source 5, and reduce the average current flowing through field 97. The speed of the motor will thereupon increase if it again reaches the desired operating value.

The motor control system described above utilizes component parts which are inherently rugged and long-lived, and which require a minimum of periodic maintenance or replacement. It has been found that by virtue of the few component parts necessary for the system, and the inherently short time delay brought about by the nature of the components and their mode of operation, the system has extremely fast response with a minimum of hunting. The motors are not restricted to a given operating voltage or range of voltages by the primary control element (junction transistor 67) inasmuch as the transformer characteristics may be easily chosen to provide proper operating voltages.

The invention is not to be restricted to the specific structural details, arrangement of parts, of circuit connections herein set forth as various modifications thereof may be effected without departing from the spirit and scope of this invention. For example, it is apparent that several transistors may be connected in parallel with transistors 67 in order to increase the output power that may be obtained from the system, or the same result may be brought about by connection of the transistors to individual secondary windings on the transformer 77.

I claim as my invention:

1. In combination: a source of alternating current; a load; transformer means having a primary winding and a secondary winding, said primary winding being serially connected with said load across said source of alternating current; full-wave rectifier means having input terminals and output terminals, said input terminals being connected to said secondary winding for energization thereby; junction transistor means having emitter, collector and base electrodes, said emitter and collector electrodes being connected to said rectifier output terminals so that said transistor completes a circuit between said terminals through the emitter-to-collector current conduction paths thereof; pulse generating means coupled between said emitter and base electrodes adapted to drive said transistor means between collector current cutoff and saturation, and means coupled to said pulse generating means for controlling the time duration of the output pulses therefrom.

2. Apparatus for controlling the flow of alternating current through a load comprising: ferromagnetic core transformer means having a primary winding serially connected with said load and secondary winding means for energizing input terminals of full wave rectifier means; transistor means having at least emitter, collector and base electrodes; said output terminals being connected to said emitter and collector electrodes so that said transistor provides a load for said rectifier through the emitter-to-collector current conduction path thereof; pulse generating means adapted to drive said transistor means from collector current cutoff to saturation, and means coupled to said pulse generating means for controlling the duration of the pulses generated thereby.

3. Apparatus for controlling current flow through a load comprising: saturable core transformer means having primary winding means and secondary winding means thereon such that a substantial short circuit across said secondary winding means reduces the impedance of said primary winding means to substantially its air core impedance to vary the impedance presented by said primary winding means to a load serially connected thereto; full-wave rectifier means having input terminals and output terminals, said input terminals being connected to said secondary winding means so as to be energized thereby; junction transistor means having emitter electrode means, base electrode means, and collector electrode means; said emitter electrode means and collector electrode means being connected to said output terminals so that said transistor means is adapted to be biased to conduction upon appearance of output voltage across said output terminals; means coupled to said base and emitter electrode means adapted to apply pulses thereto for driving said transistor between collector current saturation and cutoff, means coupled to said means for varying the pulse duration of said pulses in accordance with the magnitude of a control voltage applied thereto.

4. In a motor control system for a motor, the speed of which is variable in accordance with the current through a field winding thereof; first means coupled to said motor for deriving a voltage, the magnitude of which is proportional to the speed of said motor; a reference voltage source; second means coupled to said first means and to said reference voltage source for deriving a control voltage, the magnitude of which is proportional to the difference of the magnitudes of the output voltages of said first means and said reference voltage source; pulse generating means coupled to said second means, the output pulses from said pulse generating means being variable in duration in accordance with the magnitude of said control voltage; transformer means having a center-tapped secondary winding, and having a primary winding adapted to be energized by a source of alternating current; means serially coupling said field winding to said primary winding so that the current through said field winding is variable in accordance with the series reactance of said primary winding, and means for varying said series reactance of said primary winding including junction transistor means having emitter, collector and base electrodes, full wave rectifier means having input terminals and output terminals, said input terminals being connected to said primary winding to be energized thereby, said emitter and collector electrodes of said transistor means being connected to said output terminals so that the output voltage therefrom will supply operating bias thereto; said pulse generating means being coupled to said emitter and base electrodes so that said output pulses drive said transistor means between collector current cutoff and saturation in alternation.

5. In a control circuit for a motor having a field winding for varying the motor rotational speed in accordance with the magnitude of the average current therethrough: ferromagnetic-core transformer means having a primary winding serially connected with said load through full wave rectifier means; said transformer means having a secondary winding adapted to reduce the reactance of said primary winding to substantially the air-core reactance thereof upon imposition of a load of less than a given magnitude across the terminals of said secondary winding; junction transistor means having emitter, base, and collector electrodes, the emitter-to-collector impedance of which is less than said given magnitude when the collector current thereof is driven to saturation by a signal coupled between the base electrode and an adjacent electrode thereof; full wave rectifier means coupling said emitter and base electrodes to said secondary winding; means including pulse generating means coupled to said base electrode and said adjacent electrode adapted to repetitiously switch said collector current between conditions of cutoff and saturation; and means adapted to vary the duty cycle of the output signal of said means as a direct function of said motor rotational speed.

References Cited in the file of this patent
UNITED STATES PATENTS
2,725,508    Bailey et al. _____ Nov. 29, 1955